United States Patent
Sabini et al.

(10) Patent No.: US 7,746,063 B2
(45) Date of Patent: Jun. 29, 2010

(54) SPEED INDICATION FOR PUMP CONDITION MONITORING

(75) Inventors: Eugene P. Sabini, Skaneateles, NY (US); Jerome A. Lorenc, Seneca Falls, NY (US); Kenneth L. Hauenstein, Seneca Falls, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1065 days.

(21) Appl. No.: 11/378,622

(22) Filed: Mar. 16, 2006

(65) Prior Publication Data

US 2007/0216398 A1 Sep. 20, 2007

(51) Int. Cl.
*G01P 3/48* (2006.01)
(52) U.S. Cl. .................................. 324/166; 417/326
(58) Field of Classification Search .................. 324/166, 324/503, 207.25, 207.17; 73/864.34; 364/510; 318/400.17, 276, 802, 400.01; 417/282, 417/44.1, 326
See application file for complete search history.

(56) References Cited

U.S. PATENT DOCUMENTS

| 4,249,120 | A | 2/1981 | Earle |
| 4,678,404 | A | 7/1987 | Lorett et al. |
| 5,577,890 | A | 11/1996 | Nielsen et al. |
| 6,534,947 | B2 | 3/2003 | Johnson et al. |
| 6,798,192 | B2 * | 9/2004 | Faymon et al. ............... 324/166 |
| 6,857,858 | B2 * | 2/2005 | Jeun ............................ 417/45 |

\* cited by examiner

*Primary Examiner*—Reena Aurora

(57) ABSTRACT

A method and apparatus are provided for obtaining the rotational speed of a pump system or other suitable rotating equipment having a self-contained pump electrical equipment power supply. The method features, before being rectified, directing one phase of AC power through a zero crossing circuit that identifies an instant of time the AC voltage crosses from one polarity to the other polarity and triggers a square wave pulse for each instant time. In operation, the AC voltage is detected when it crosses from a negative polarity to a positive polarity, or vice versa. The method also includes steps for measuring the period of the square wave pulse and calculating the speed of the pump or other rotating equipment.

19 Claims, 2 Drawing Sheets

SPEED INDICATION FOR PUMP CONDITION MONITORING

BACKGROUND OF THE INVENTION

1. Technical Field

The present invention generally relates to a pump system or other rotational equipment; and more particularly to a pump system or other rotational equipment having a module or other suitable device for performing pump condition monitoring.

2. Description of Related Problem

There are several commonly employed techniques to obtain the rotational speed of a pump or other rotating equipment:

For example, a photo tachometer directs either a laser, infer red or visible light toward a reflective tape attached on the rotating shaft of a pump or other rotating equipment. A photo pickup in the photo tachometer senses the change in reflected light each time the tape passes. Speed in revolutions per minute is calculated from the period between the sensed light intensity changes.

An inductive or capacitive switch may be placed near the key or keyway or the rotating shaft of the pump or other rotating equipment. As the key or keyway moves past the switch, it causes a change of state of the switch. Again an indicator connected to the switch measures the period between change of states of the switch and calculates the speed in revolutions per second or per minute.

A sixty tooth gear may be attached to some section of the shaft of the pump or other rotating equipment. Placed near to the gear is an electromagnetic sensor that is capable of generating a voltage dependent on the proximity of metal to it. The time varying voltage signal is connected to a frequency counter. Because a 60 tooth gear is used, the frequency (hertz) counter displays speed directly in revolutions per minute.

A vibration sensor on the pump or other rotating equipment connected to a spectrum analyzer with sufficient frequency resolution can indicate the frequency of 1x vibrations of the equipment.

An older but still used way of determining the operating speed of a pump or other rotation equipment is to use a strobe light. The strobe light is pointed to the part of the rotating shaft and the strobe's flashing rate is adjusted until the shaft appears to stop rotating. The strobe's flashing rate can be the actual operating speed of the equipment.

Moreover, a magnet collar may be attached to the rotating shaft with a Hall effect sensor positioned nearby. Such is the technique employed in patent application Ser. No. 10/142,181, filed on 9 May 2002, entitled "Self contained Pump Electrical Equipment Power supply", which is incorporated by reference herein in its entirety. However, when attempting to measure speed using the self contained pump electrical equipment power supply device described therein, a Hall Effect sensor was embedded in the stator of the generating device and wired back to an indicator circuit. As the magnets rotated past the Hall Effect sensor, it would change state and the period of the state changes along with the number of magnets past the Hall Effect sensor per revolution were used to calculate the rotational speed of the shaft.

All of the above methods are valid techniques for obtaining the speed of a rotating piece of equipment. All have and are being employed in the art. The disadvantage for all of the above systems is that they require a sensing device and the wiring back to an indicator. The whole thrust of the present invention is to eliminate such a sensing device.

Moreover, a patentability search was conducted on the present invention and various patents were developed in the search, which are summarized as follows:

One patent discloses a solid state pump control and protection system having a power supply coupled to a pump control system for controlling the operation of a pump. The pump control system has an analog module with a current phase detector, a pressure transducer and an over/under voltage detector, for analyzing the status of the pump based on these sensed parameters. A second patent discloses a variable speed induction motor control system having a DC bridge that has its input coupled to a source of 60 Hz three phase power. This input is not directed, before being rectified, to any circuit, especially a zero crossing circuit. The DC bridge is also coupled to a Hall Effect sensor for detecting the current from the same. A third patent discloses a variable RPM submersible pump that may be controlled by a variable drive system, having a rectifier that receives inputs from a three phase power source located at the surface. Similar, to that disclosed in the above patents, no input from the three phase power source is directed, before being rectified, to any circuit, especially a zero crossing circuit. A fourth patent discloses a pump protection module or device having two input nodes for coupling to an AC power source and a motor M, which includes a voltage filter and zero-cross detection circuit and a current filter and zero-cross detection circuit both coupled to a microcontroller. In operation, the microcontroller opens and closes the switch based on a phase comparison between the voltage and current signals from these circuits depending on a determined load condition. Similar, to the above patents, the microcontroller does not use the input from these circuits to obtain the rotational speed of a pump or other suitable rotating equipment. None of these patents developed in the search disclose the whole thrust of the present invention.

SUMMARY OF THE INVENTION

In its broadest sense, the present invention provides a new and unique method and apparatus for obtaining the rotational speed of a pump or other suitable rotating equipment having a power supply, such as a self-contained pump electrical equipment power supply. The method features, before being rectified, directing one phase of AC power through a zero crossing circuit that identifies an instant of time the AC voltage crosses from one polarity to the other polarity and triggers a square wave pulse for each instant time. In operation, the AC voltage is detected when it crosses from a negative polarity to a positive polarity, or vice versa. The method also includes steps for measuring the period of the square wave pulse and calculating the speed of the pump or other rotating equipment.

One advantage of the present invention is that it effectively eliminates the need for a Hall Effect or other suitable sensor and its associated wiring otherwise used to obtain the rotational speed of the pump.

According to the present invention, the apparatus may take the form of a pump or other suitable rotating equipment, consistent with that described herein. In this case, the self contained pump electrical equipment power supply or other suitable power supply may include a stationary stator within which magnets on the shaft rotate to produce AC power. The stationary stator is connected back to circuitry that rectifies and regulates the power for pump instrumentation and monitoring operations. Before one of the phases of AC power is rectified, it is directed through a zero crossing circuitry that identifies the instant the AC voltage crosses from negative to positive voltage. This zero crossing or identification circuit then triggers a square voltage wave pulse for each time the AC voltage crosses from negative to positive voltage.

Circuitry that is employed in many of the above mentioned known speed measurement approaches may be adapted and used to measure the period of square voltage wave pulse and calculate the speed of the pump or other rotating equipment that has the self contained pump electrical equipment power supply attached.

The method includes implementing the steps thereof via a computer program running in a processor or control module consistent with that described herein.

The foregoing and other objects, features and advantages of the present invention will become more apparent in light of the following detailed description of exemplary embodiments thereof.

BRIEF DESCRIPTION OF THE DRAWING

The drawing, which is not drawn to scale, includes the following Figures.

BEST MODE FOR CARRYING OUT THE INVENTION

Figure 1:
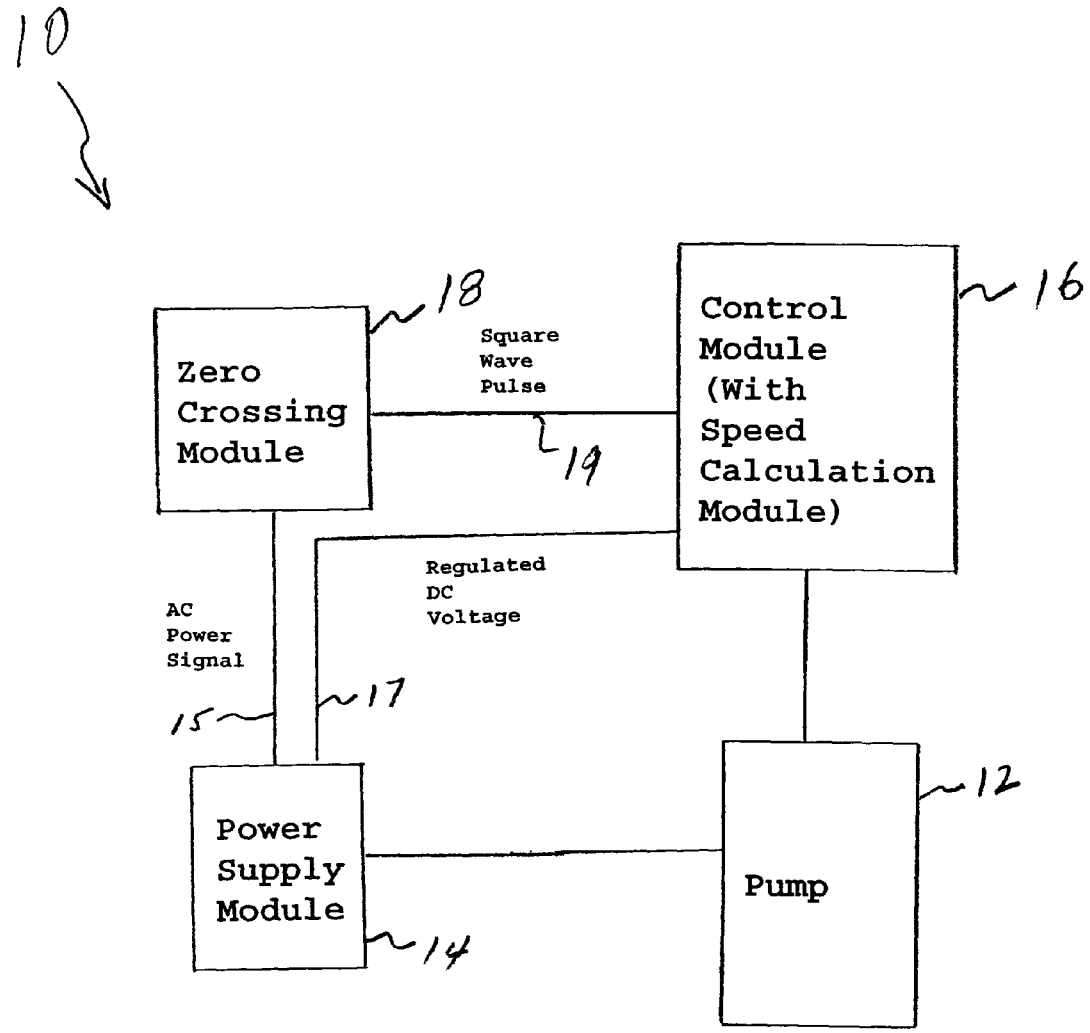
FIG. 1 show a block diagram of a pump system or other suitable rotating equipment according to the present invention.

FIG. 1 shows, by way of example, a pumping system or other suitable rotating equipment generally indicated as 10, having a power supply module 14 and a module such as control module 16 for obtaining the rotational speed thereof. The present invention features a new and unique zero crossing circuit 18 that responds to one phase of AC power before being rectified from the power supply 14, identifies an instant of time the AC voltage crosses from one polarity to the other polarity and triggers a square wave pulse on line 19 for each instant time. In operation, the AC voltage from the power supply module 14 may be detected when it crosses from a negative polarity to a positive polarity, or vice versa. The control module 16 measures the period of the square wave pulse and calculates the speed of the pump 12 or other rotating equipment. The control module 16 may use the calculation of the speed of the pump 12 to control the basic operation of the pump 12, although the scope of the invention is not intended to be limited to how the calculation is used in the overall pumping system 10.

The pump 12 is known in the art and the scope of the invention is not intended to be limited to any particular type or kind thereof either now known or later developed in the future. The pump 12 may include types of equipment, including but not limited to an impeller shaft, a drive motor, etc., which are all known in the art, and not shown or described herein since they do not form part of the underlying invention.

Figure 2:
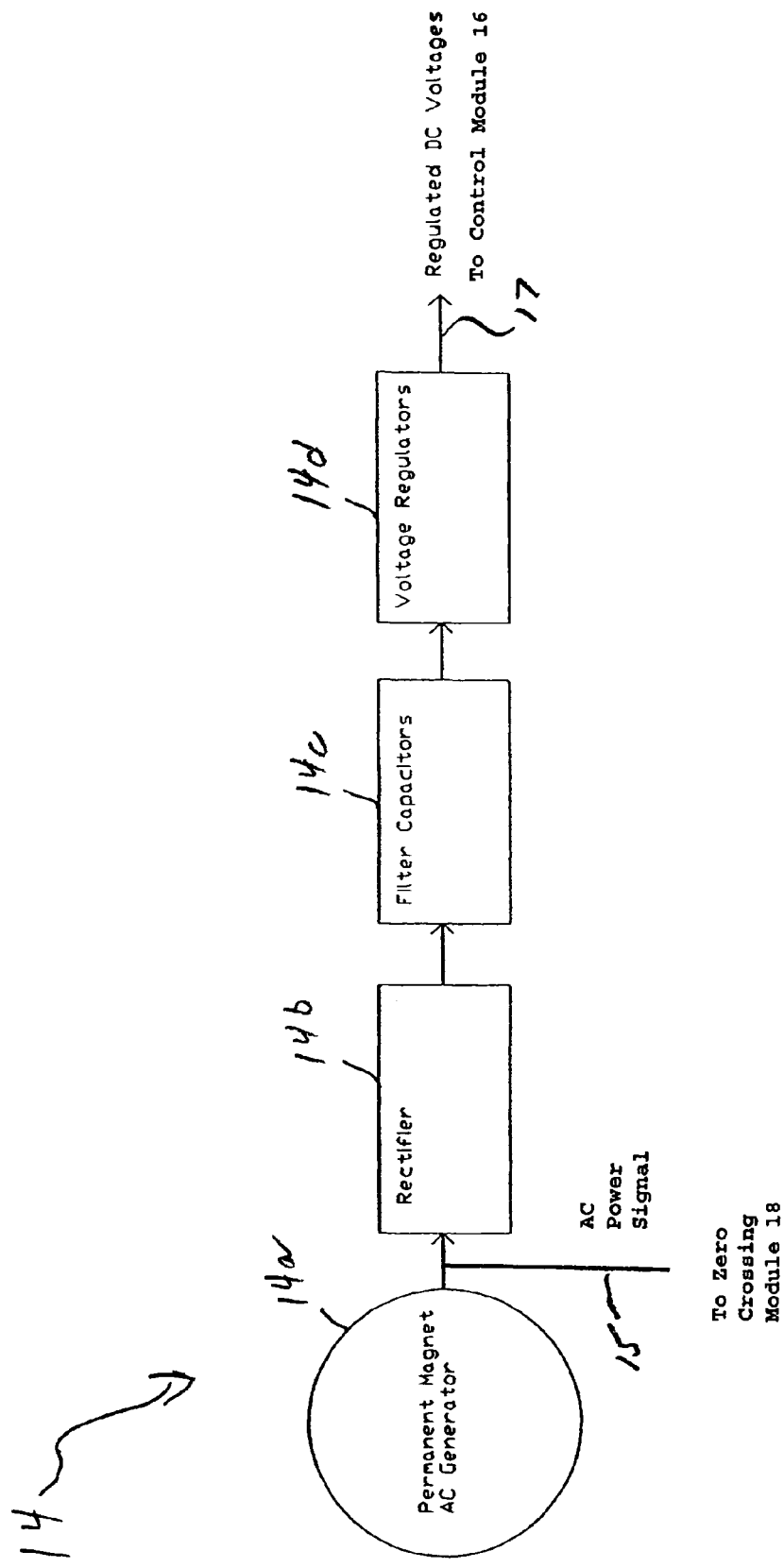
FIG. 2 show a block diagram of the power supply module shown in FIG. 1 according to the present invention.

The power supply module 14 is known in the art and the scope of the invention is not intended to be limited to any particular type or kind thereof either now known or later developed in the future. FIG. 2 shows, by way of example, the basic components of the power supply module 14, including a permanent magnet AC generator 14a, a rectifier 14b, one or more filter capacitors 14c, one or more voltage regulator 14d, which are shown and described in the aforementioned application Ser. No. 10/142,181. Permanent magnet AC generators such as 14a, rectifiers such as 14b, filter capacitors such as 14c and voltage regulators such as 14d are all known in the art, and the invention is not intended to be limited to any particular type or kind thereof. For example, the permanent magnet AC generator 14a may include a stationary stator and magnets that cooperate to provide the AC power signal in a manner that is known in the art and not described in detail herein. In operation, before being rectified, the AC power signal on line 15 from the permanent magnet AC generator 14a is directed to the zero crossing module 18 consistent with that described above. The voltage regulator 14d provides a regulated DC voltage on line 17 to the control module 16, although the scope of the invention is not intended to be limited to where the regulated DC voltage is provided or how it is used on the pump system 10.

Many different types and kind of control modules for controlling pumps are known in the art. Based on an understanding of such known control modules, a person skilled in the art would be able to implement a control module such as 16 to perform functionality consistent with that described herein, including measuring the period of the square wave pulse received on line 19, calculating the speed of the pump 12 or other rotating equipment based on the same, and/or controlling the basic operation of the pump 12 based on the same. By way of example, the functionality of the control module 16 may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future.

Many different types and kind of zero crossing modules and/or circuits are known in the art and the scope of the invention is not intended to be limited to any particular type or kind thereof either now known or later developed in the future. Based on an understanding of such known zero crossing modules and/or circuits, a person skilled in the art would be able to implement a zero crossing module such as 18 to perform functionality consistent with that shown and described herein, including identifying an instant of time the AC voltage crosses from one polarity to the other polarity and triggering a square wave pulse for each instant time. Embodiments are also envisioned in which the zero crossing module or circuit 18 is not a stand alone module, but instead forms part of the power supply module 14, the control module 16, some combination thereof, or some other module that forms part of the pumping system 10.

Possible Applications

The present invention eliminates the need for the addition of a Hall Effect sensor in each pump electrical equipment power supply stator build and the additional wiring. Rotational speed indication is an important measurement in the design of intelligent pumping systems for implementing in on-line pump condition monitoring. Rotational speed indication is a critical measurement for the pump rule based and fuzzy logic pump predictive analysis being used in state of the art pumping systems.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A method comprising:
   receiving in one or more modules an input signal containing information about one phase of an AC power supply that provides power to a pump or other suitable rotating equipment, the one phase of the AC power supply being directed, before being rectified, through a zero crossing circuit, and the input signal containing information about an instant of time the AC voltage crosses from one polarity to the other polarity and triggers a square wave pulse for each instant time; and
   providing from the one or more modules an output signal containing information to control the pump or other suitable rotating equipment based at least partly on a determination of the rotational speed of the pump that depends on the information contained in the input signal received, such that the need for a Hall Effect or other suitable sensor and its associated wiring otherwise used to obtain the rotational speed of the pump is eliminated.

2. A method according to claim 1, wherein at each instant of time the AC voltage crosses from a negative polarity to a positive polarity, or vice versa.

3. A method according to claim 2, wherein the method further comprises measuring the period of the square wave pulse and calculating the speed of the pump or other rotating equipment based at least partly on the period measured.

4. A method according to claim 1, wherein the method further comprises measuring the period of the square wave pulse and calculating the speed of the pump or other rotating equipment based at least partly on the period measured.

5. A method according to claim 1, wherein the method further comprises implementing the method via a computer program running in a processor or controller module.

6. A method according to claim 1, wherein the power supply is a self-contained pump electrical equipment power supply.

7. A pump system or other suitable rotating equipment having a power supply for providing AC power to a pump or other suitable rotating equipment, comprising: a control module configured to:
   receive an input signal containing information about one phase of an AC power supply that provides power to a pump or other suitable rotating equipment, the one phase of the AC power supply being directed, before being rectified, through a zero crossing circuit, and the input signal containing information about an instant of time the AC voltage crosses from one polarity to the other polarity and triggers a square wave pulse for each instant time; and
   provide an output signal containing information to control the pump or other suitable rotating equipment based at least partly on a determination of the rotational speed of the pump that depends on the information contained in the input signal received, such that the need for a Hall Effect or other suitable sensor and its associated wiring otherwise used to obtain the rotational speed of the pump is eliminated.

8. A pump system or other suitable rotating equipment according to claim 7, wherein at each instant of time the AC voltage crosses from a negative polarity to a positive polarity, or vice versa.

9. A pump system or other suitable rotating equipment according to claim 7, wherein the control module is configured to measure the period of the square wave pulse and calculate the speed of the pump or other rotating equipment based at least partly on the period measured.

10. A pump system or other suitable rotating equipment according to claim 7, wherein the control module is configured as a controller having the zero crossing module or circuit forming a part thereof.

11. A pump system or other suitable rotating equipment according to claim 7, wherein the power supply is a self-contained pump electrical equipment power supply.

12. A control module comprising:
    one or more modules configured to receive an input signal containing information about one phase of an AC power supply that provides power to a pump or other suitable rotating equipment, where the one phase of the AC power supply is directed, before being rectified, through a zero crossing circuit, and where the input signal contains information about an instant of time the AC voltage crosses from one polarity to the other polarity and triggers a square wave pulse for each instant time; and
    configured to provide an output signal containing information to control the pump or other suitable rotating equipment based at least partly on a determination of the rotational speed of the pump that depends on the information contained in the input signal received, such that the need for a Hall Effect or other suitable sensor and its associated wiring otherwise used to obtain the rotational speed of the pump is eliminated.

13. A control module according to claim 12, wherein the one or more modules is also configured to measure the period of the square wave pulse and calculate the speed of the pump or other rotating equipment based at least partly on the period measured.

14. A control module according to claim 12, wherein at each instant of time the AC voltage crosses from a negative polarity to a positive polarity, or vice versa.

15. A control module according to claim 12, wherein the one or more control modules is configured to form part of a pump system or other suitable rotating equipment.

16. A pump system or other suitable rotating equipment having a power supply, comprising:
    a zero crossing module or circuit configured to respond to one phase of AC power from the power supply, before being rectified, to identify an instant of time the AC voltage crosses from one polarity to the other polarity and to provide a signal containing information about a square wave pulse for each instant time; and
    one or more control modules configured to receive the signal and to provide an output signal containing information to control the pump or other suitable rotating equipment based at least partly on a determination of the rotational speed of the pump or other suitable rotating equipment that depends on the information contained in the signal received, such that the need for a Hall Effect or other suitable sensor and its associated wiring otherwise used to obtain the rotational speed of the pump is eliminated.

17. A pump system or other suitable rotating equipment according to claim 16, wherein at each instant of time the AC voltage crosses from a negative polarity to a positive polarity, or vice versa.

18. A pump system or other suitable rotating equipment according to claim 16, wherein the one or more modules is also configured to measure the period of the square wave pulse and calculate the speed of the pump or other rotating equipment based at least partly on the period measured.

19. A pump system or other suitable rotating equipment according to claim 16, wherein the control module is configured to form part of a pump system or other suitable rotating equipment.

* * * * *